(12) United States Patent
Kirbas et al.

(10) Patent No.: US 8,406,813 B2
(45) Date of Patent: Mar. 26, 2013

(54) SYSTEM AND METHOD FOR RESTRICTING WIRELESS COMMUNICATION

(75) Inventors: Bilhan Kirbas, La Jolla, CA (US); Maria-Ellen Christy, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1407 days.

(21) Appl. No.: 09/849,715

(22) Filed: May 4, 2001

(65) Prior Publication Data

US 2002/0165012 A1    Nov. 7, 2002

(51) Int. Cl.
*H04M 1/00* (2006.01)
(52) U.S. Cl. .......... 455/565; 455/456.1; 455/456.6; 455/415; 455/432.1; 455/566; 455/406; 455/456.2; 455/456.5; 455/414.1; 455/550.1
(58) Field of Classification Search .......... 455/414.1, 455/417, 421, 422.1, 456.1, 456.3, 456.5, 455/458, 565, 410–411, 403, 414, 456.6, 455/406, 432.1, 425, 550.1, 456.4; 379/93.02, 379/88.23, 200, 201.01
See application file for complete search history.

(56) References Cited

U.S. PATENT DOCUMENTS

| 5,251,252 | A | | 10/1993 | Katz |
| 5,809,126 | A | | 9/1998 | Smith et al. |
| 5,828,734 | A | | 10/1998 | Katz |
| 5,884,193 | A | * | 3/1999 | Kaplan .......... 455/565 |
| 5,995,823 | A | * | 11/1999 | Stephens ........ 455/410 |
| 6,011,973 | A | * | 1/2000 | Valentine et al. .......... 455/456.6 |
| 6,085,080 | A | * | 7/2000 | Rahikainen et al. .......... 455/403 |
| 6,208,872 | B1 | * | 3/2001 | Schmidt .......... 455/518 |
| 6,256,503 | B1 | * | 7/2001 | Stephens .......... 455/456.6 |
| 6,256,515 | B1 | * | 7/2001 | Cox et al. .......... 455/565 |
| 6,556,819 | B2 | * | 4/2003 | Irvin .......... 455/410 |
| 6,560,455 | B2 | * | 5/2003 | Amin et al. .......... 455/432.3 |
| 6,799,052 | B2 | * | 9/2004 | Allegrezza et al. .......... 455/456.4 |
| 7,042,867 | B2 | * | 5/2006 | Whitehill et al. .......... 370/338 |
| 7,212,802 | B2 | * | 5/2007 | Rodriguez .......... 455/405 |

* cited by examiner

*Primary Examiner* — Willie J Daniel, Jr.

(57) ABSTRACT

A system and a method for restricting wireless communication are provided. A wireless communications device stores a list of geographic characteristics such as, for example, area codes representing either area codes to which calls are only allowed or area codes to which calls are not allowed. If the stored area codes are area codes to which calls are only allowed, then the wireless communications device only allows calls to one of the stored area codes. If the stored area codes are area codes to which calls are not allowed, then the wireless communications device does not allow calls to any of the stored area codes.

11 Claims, 2 Drawing Sheets

SYSTEM AND METHOD FOR RESTRICTING WIRELESS COMMUNICATION

FIELD OF THE INVENTION

The present invention generally relates to a system and a method for restricting wireless communication and, more specifically, to a system and a method for restricting wireless communication that includes a wireless communications device.

BACKGROUND OF THE INVENTION

In the cellular service provider industry, for example, it is common place to lend potential or existing clients cellular phones for marketing and testing purposes. Thus, if a potential client is interested in testing a particular cellular service, then the cellular service provider may give the potential client a loaner phone. Alternatively, an existing client may be given, for example, a beta cellular phone for testing a new set of features of the cellular phone or the cellular service provider. In either scenario, the cellular phone is given with explicit instruction such as, for example, not to make long distance calls on the loaner phone.

Typically, the costs of the phones calls made on these cellular phones are entirely absorbed by the cellular service provider or the company that provided the cellular phone. However, in spite of the explicit instructions, abuse of these cellular phones in making long distance calls is widespread and costly. Many cellular service providers end up taking back the cellular phones with neither the client nor the cellular service provider meeting the intended objectives. Accordingly, both the client and the company are left with a negative impression of the relationship. It would be advantageous for a cellular service provider to employ a cellular phone that is capable of blocking out calls to particular area codes (e.g., area codes that would accrue long distance tolls) in a controlled and systematic manner.

In another area of concern, many service industries employ representatives or employees that travel great distances. In many instances, cellular phones are given to these representatives or employees so that they can keep in touch with the company. For example, a trucking company that delivers products across the country may give its drivers cellular phones with explicit instructions that the phone is only to be used in calling or receiving calls from the dispatcher in the home office in a particular area code. However, abuse of the cellular phones by making personal long distance calls is not uncommon. In this case, it would be impractical to block out long distance calls since most of the communications between the dispatch and the driver require a long distance call. Instead, it would be advantageous for the trucking company to employ a cellular phone that allows phone calls only to a limited set of area codes.

Accordingly, there is a need for a system and a method for providing a wireless communications device that restricts access based upon particular geographical characteristics of an inputted phone number.

SUMMARY OF THE INVENTION

The present invention alleviates to a great extent the disadvantages of the known systems and methods for restricting wireless communication. In a preferred embodiment, a system and a method for restricting wireless communication includes a wireless communications device. The wireless communications device may be in wireless communication (e.g., by infrared signals, radio frequency signals, etc.) with a wireless communications network such as, for example, a digital or analog cellular communications network and/or a positioning system such as a global positioning system (GPS). In a memory of the wireless communications device is stored a plurality of authorized and/or unauthorized geographic characteristics. In an attempt to make a phone call on the wireless communications device, a user inputs a phone number into the wireless communications device. The wireless communications device determines a particular geographic characteristic of the inputted phone number. The determined geographic characteristic is compared with geographic characteristics stored in the memory of the wireless communications device.

In one embodiment, the present invention provides that the phone call is placed if the determined geographic characteristic matches any of the authorized geographic characteristics stored in the memory of the wireless communications device. If the determined geographic characteristic does not match any of the authorized geographic characteristics then the phone call is not placed and the wireless communications device provides a response indicating that the user has attempted an unauthorized call.

In another embodiment, the present invention provides that the phone call is placed if the determined geographic characteristic does not match any of the unauthorized geographic characteristics stored in the memory of the wireless communications device. If the determined geographic characteristic matches any of the unauthorized geographic characteristics then the phone call is not placed and the wireless communications device provides a response indicating that the user has attempted an unauthorized call.

The present invention contemplates that the authorized and/or unauthorized geographic characteristics are stored in the memory, the controller or some combination thereof. In one embodiment, the present invention provides that the memory include a programmable read-only memory (PROM) on which is stored the authorized and/or unauthorized geographic characteristics. The PROM may also include at least a portion of the software for carrying out the method in accordance with the present invention. The PROM may or may not be rewritable.

The present invention has an advantage in that wireless communication devices may be distributed without worrying about absorbing the excessive costs normally associated with the abuse of the wireless communication device (e.g., by making unauthorized phone calls).

Some aspects of the present invention have an advantage in that wireless communications device can be cost effectively programmed to restrict particular wireless communications. Additional system-wide efficiencies are achieved since the restrictions occur in the wireless communications device and not in the wireless communications network.

These and other features and advantages of the present invention will be appreciated from review of the following detailed description of the invention, along with the accompanying figures in which like reference numerals refer to like parts throughout.

DETAILED DESCRIPTION OF THE INVENTION

In accordance with the present invention, a system and a method for restricting wireless communication are provided.

Figure 1:
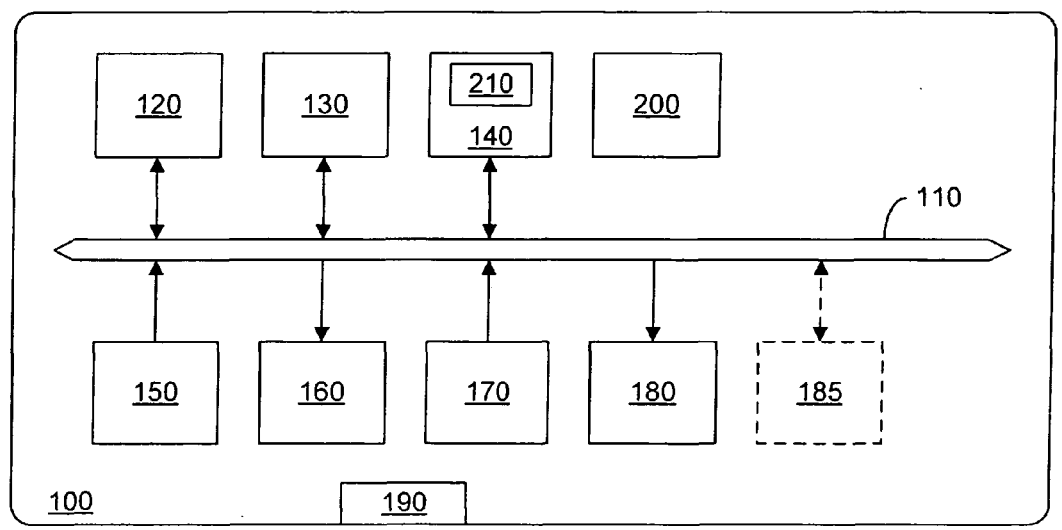
FIG. 1 is a block representation illustrating a wireless communications device according to the present invention.

As illustrated in FIG. 1, an exemplary wireless communications device 100 includes various components coupled via a bus 110. A controller 120 is coupled to the bus 110 and, for example, controls access to and information flow on the bus 110. A memory 130 is coupled to the bus 110 and provides temporary and/or permanent memory storage (e.g., RAM and/or ROM). The memory 130 may also include insertable and/or external memory such as, for example, magnetic-media tapes and/or disks, CD-ROMs, cards and cartridges. Although the controller 120 and the memory 130 communicate via the bus 110, the present invention also contemplates that various components (e.g., the controller 120 and the memory 130) can communicate directly with each other without using the bus 110 or are integrated to various degrees. Thus, the controller 120 may be partially integrated, for example, to include at least a portion of the memory 130.

In a preferred embodiment, the present invention may also provide that the wireless communications device 100 include a transceiver 140 with an antenna 210, a microphone 150, a speaker 160, an input device 170 (e.g., a keypad, functional buttons, navigation keys and/or a keyboard), a display 180, and a port 190 (e.g., a data port, a serial port and/or a parallel port), each of which is coupled to the bus 110. In the preferred embodiment, the controller 120, the memory 130, the transceiver 140 and the port 190 are in two-way communication with the bus 110. The microphone 150, the speaker 160, the input device 170 and the display 180 are in one-way communication with the bus 110. The wireless communications device 100 also may include a timing mechanism 200 (e.g., a clock and/or a timer) that is accessible by any of the components of the wireless communications device 100.

In addition, the blocks illustrated in FIG. 1 are merely general representations that are intended to include other circuitry, interfaces and sub-components that are well known. Thus, for example, the transceiver 140 might include an amplifier circuit, an analog-to-digital converter (ADC) and/or signal filters. Such interfaces and circuits are well known in the art and are not detailed further. Some examples of conventional wireless communications circuitry can be found, for example, in Understanding Telephone Electronics by Stephen J. Bigelow (3d. 1997), which is incorporated by reference in its entirety.

Figure 2:
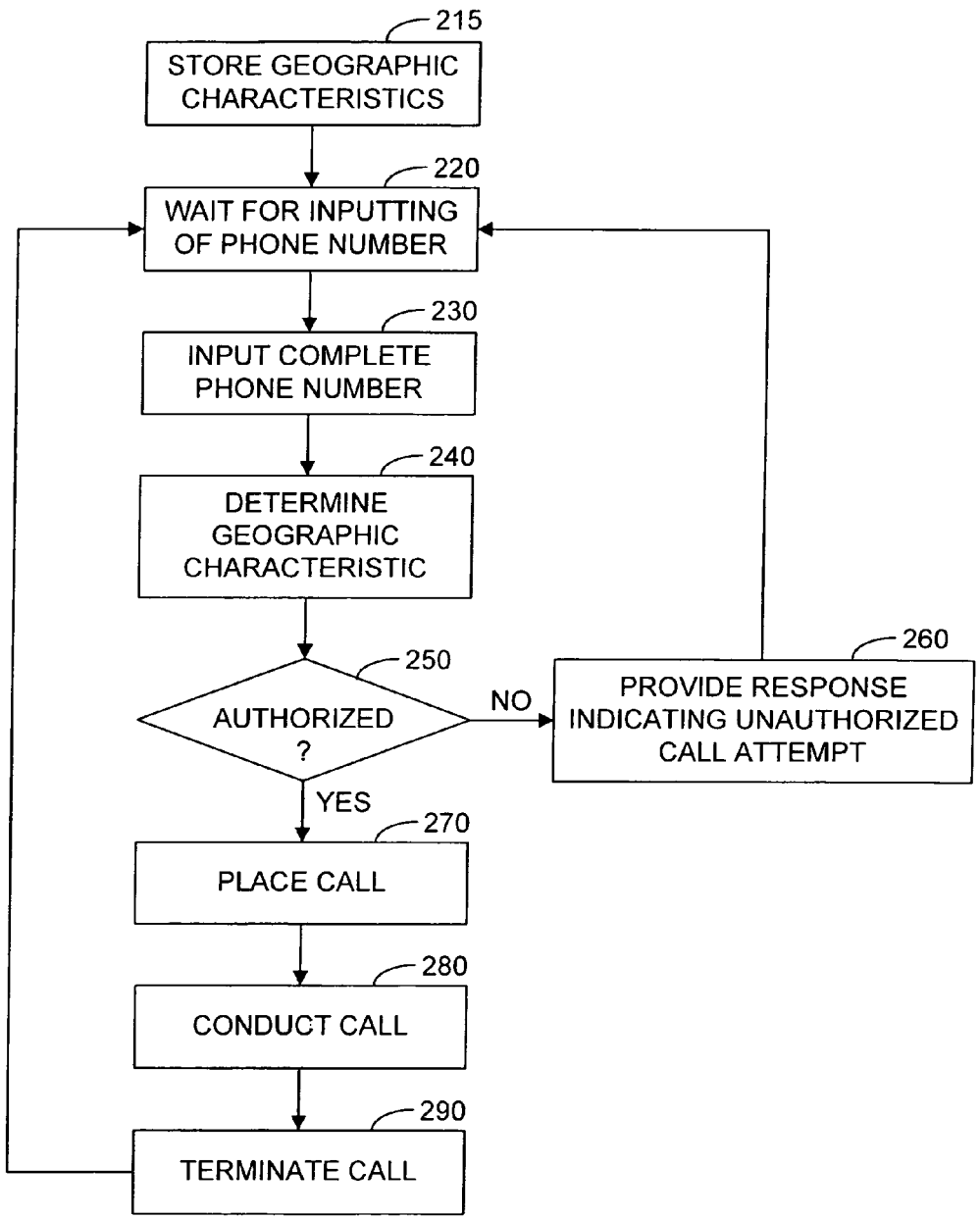
FIG. 2 is a flow diagram illustrating a process for restricting wireless communication according to the present invention.

FIG. 2 shows a flow diagram illustrating an embodiment of a process for restricting the wireless communications device 100. The process may be implemented in software, hardware or some combination thereof. In addition, the process may be stored in the controller 120, the memory 130 or some combination thereof.

The wireless communications device 100, in step 215, stores a list of authorized and/or unauthorized geographic characteristics in the memory 130. Geographic characteristics relate to geographic information that may be ascertained from a phone number and/or the present location of the wireless communications device 100. Geographic information may include, for example, area codes and/or sets of phone numbers within particular area codes. Furthermore, the geographic information may include parameters indicating whether, for example, the area codes and/or sets of phone numbers within particular area codes are authorized and/or unauthorized. Additional information may be present in the geographic characteristics indicating whether particular calls accrue local or long distance charges.

Then, the wireless communications device waits, in step 220, for the user to input a complete phone number via the input device 170. In step 230, the user inputs the complete phone number via the input device 170. In step 240, the controller 120 determines the particular geographic characteristic of the inputted phone number. For example, the controller 120 can determine the particular area code of the inputted phone number. In step 250, the controller 120 checks whether the particular geographic characteristic of the phone number is authorized and/or unauthorized.

In one embodiment, the present invention provides that the controller 120 check whether the particular area code of the inputted phone number matches any of the authorized area codes stored in the memory 130. If the particular area code does not match any of the authorized area codes, then, in step 260, the wireless communications device does not place the call and instead provides a response indicating that the attempted call is to an unauthorized area code. For example, the wireless communications device 100 displays an appropriate message on the display 180 and/or alerts the user via an audio beep or voice message via the speaker 160. Subsequently, the process loops back to step 220. If the area code does match one of the authorized area codes then, in step 270, the phone call is placed. In step 280 and step 290, the call is conducted and the call is terminated, respectively. The process then loops back to step 220.

In another embodiment, the present invention provides that the controller 120 check whether the particular area code of the inputted phone number matches any of the unauthroized area codes stored in the memory 130. If the particular area code does match any of the unauthorized area codes then, in step 260, the wireless communications device does not place the call and instead provides a response indicating that the attempted call is to an unauthorized area code. For example, the wireless communications device 100 displays an appropriate message on the display 180 and/or alerts the user via an audio beep or voice message via the speaker 160. Subsequently, the process loops back to step 220. If the area code does not match one of the unauthorized area codes then, in step 270, the phone call is placed. In step 280 and step 290, the call is conducted and the call is terminated, respectively. The process then loops back to step 220.

Figure 3:
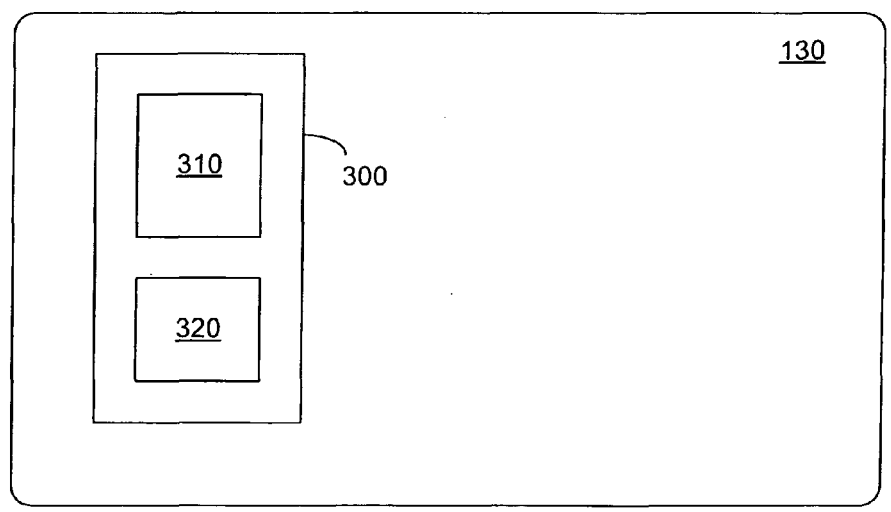
FIG. 3 is a block representation illustrating an embodiment of a memory according to the present invention.

As illustrated in FIG. 3, an exemplary method and system for programming the wireless communications device 100 are provided. In a preferred embodiment, the present invention provides a portion 300 of the memory 130 that includes a section 310 and another section 320. Section 310 of the memory 130 includes the instruction sets for carrying out the process for determining whether an attempted call is authorized and/or unauthorized according to the present invention. Section 320 of the memory 130 includes a database that contains, for example, a list of unauthorized and/or authorized geographic characteristics (e.g., unauthorized and/or authorized area codes). The instruction sets and the database can be accessed, for example, by the controller 120 either directly or via the bus 110. Alternatively, the controller 120 is programmed at least in part with some portion of the instruction sets and/or the database.

The memory 130 can be programmed in a number of ways according to the present invention. For example, the instruction sets and the database can be programmed via the input device 170 and/or the display 180 of the wireless communications device 100. Alternatively, the instruction sets and the database can be downloaded via the antenna 210 of the transceiver 140. In yet another embodiment, the present invention provides a computer system that communicates with the port 190 (e.g., a data port) via, for example, a serial cable, and programs the portion 300 of the memory 130. The programming can occur at the computer system and then can be downloaded onto the portion 300 of the memory 130. Alternatively, the computer system can program the portion 300 of the memory concurrently with the connection via the port 190.

In another embodiment, the present invention provides that the portion 300 is a programmable read-only memory (PROM) or other form of read-only memory (ROM). The programming of the PROM may occur, for example, before the installation of the PROM chip. Alternatively, the PROM can be programmed or burned after installation of the PROM chip by downloading the instruction sets and the database via the antenna 210 or the port 190. For example, the computer system can connect to the wireless communications device 100 via the port 190 and program the PROM. The PROM may be unrewritable after the initial programming or may be rewritable after the initial programming, for example, for a finite number of times. Although not further detailed here, the present invention contemplates other methods and systems for programming the PROM as are known by those of ordinary skill in the art.

Furthermore, the present invention also contemplates other forms of memory that can store at least, in part, the instruction sets and the database. For example, the memory 130 may include an insertable disk or cartridge that may store information, for example, magnetically, electronically or optically. The present invention contemplates other forms of memory that are known in the art and are not further detailed here.

Referring again to FIG. 1, an alternative example of the wireless communications device 100 is illustrated. In this example, a GPS function 185 may be used to provide position location information for the wireless communications device 100. It will be appreciated that GPS is a well-known satellite-based system for accurately finding position locations. It will also be appreciated that a land-based position location system may supplement or substitute for the GPS function 185.

With the GPS function 185 provided, geographic characteristics may include absolute or relative position information. For example, the wireless communications device 100 could be set only to allow calls if the wireless communications device 100 were in a particular geographic area and if the call were made to an authorized area code. Such an arrangement could restrict, for example, a caller from travelling to a distant location and placing a call home. In such a manner, the wireless communications device 100 could restrict both the geographic location for initiating a call and the geographic location for receiving the call.

Thus, it is seen that a system and a method for restricting wireless communications devices are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A wireless communication device, comprising:
a read only memory having a list comprising area codes stored therein, at least a portion of the area codes are authorized area codes, the read only memory also having one or more authorized geographic areas stored therein, wherein each authorized geographic area comprises absolute or relative position information, the read only memory configured to restrict a user from altering the authorized area codes and the authorized geographic areas;
a user interface for accepting an inputted phone number having an area code;
a global positioning system (GPS) device for determining a current location of the wireless communication device;
a controller connected to the read only memory, the user interface, and the GPS device, the controller configured to determine whether the inputted phone number will incur a charge based on an evaluation of at least the area code, the current location, and the list comprising area codes and the one or more authorized geographic areas stored in the read only memory, wherein the controller is further configured to permit placement of a phone call to the inputted phone number only if the area code is an authorized area code and the current location of the wireless communication device is within an authorized geographic area.

2. The wireless communication device of claim 1, wherein at least a portion of the list comprising area codes are unauthorized area codes; and
wherein the controller is configured to block a phone call to the inputted number if the area code is an unauthorized area code or the current location of the wireless communication device is not within an authorized geographic area.

3. The wireless communication device of claim 1, wherein the read only memory may not be altered after being initially programmed.

4. The wireless communication device of claim 1, wherein the read only memory may only be altered a finite number of times after being initially programmed.

5. A method for restricting a requested communication on a wireless communication device, comprising:
storing in a read only memory of the wireless communication device one or more authorized geographic areas, wherein each authorized geographic area comprises absolute or relative position information, the read only memory configured to restrict a user from altering the one or more authorized geographic areas;
storing in the read only memory of the wireless communication device one or more authorized telephone number area codes, the read only memory configured to restrict the user from altering the one or more authorized telephone number area codes;
receiving the requested communication, wherein the requested communication comprises a telephone number having an area code;
determining whether the area code of the requested communication telephone number is an authorized telephone number area code stored in the read only memory of the wireless communication device;
identifying a current location of the wireless communication device;
determining whether the current location of the wireless communication device is within an authorized geographic area stored in the read only memory of the wireless communication device;
initiating a call to the telephone number in the requested communication only if the area code of the requested communication telephone number is an authorized telephone number area code and the current location of the wireless communication device is within an authorized geographic area.

6. The method of claim 5, wherein the current location is an absolute global positioning system position.

7. The method of claim 5, wherein the current location is a relative global positioning system position.

8. The method of claim 5, wherein the determining whether the area code of the requested communication telephone number is an authorized telephone number area code comprises evaluating local toll charges.

9. The method of claim 5, wherein the determining whether the area code of the requested communication telephone number is an authorized telephone number area code comprises evaluating long distance charges.

10. The method of claim 5, further comprising:
    restricting a user from altering the read only memory after initial programming of the read only memory.

11. The method of claim 5, further comprising:
    allowing only a finite number of alterations of the read only memory after initial programming of the read only memory.

* * * * *